United States Patent [19]

Kazino

[11] 4,228,722

[45] Oct. 21, 1980

[54] UPSET BOLT

[75] Inventor: Hiroshi Kazino, Komaki, Japan

[73] Assignee: Kabushiki Kaisha Aoyama Seisakusho, Nagoya, Japan

[21] Appl. No.: 916,257

[22] Filed: Jun. 16, 1978

[30] Foreign Application Priority Data

Apr. 4, 1978 [JP] Japan ............... 53-44076[U]

[51] Int. Cl.² .................................................. F16B 23/00
[52] U.S. Cl. .................................................. 85/9 R
[58] Field of Search .................. 85/9 R, 45, 1 T

[56] References Cited

U.S. PATENT DOCUMENTS

| | | | |
|---|---|---|---|
| 2,133,465 | 10/1938 | Purnell | 85/45 X |
| 2,213,813 | 9/1940 | Hunt | 85/45 X |
| 2,229,565 | 1/1941 | Hallowell | 85/45 X |
| 2,296,887 | 9/1942 | West | 85/45 |
| 2,353,531 | 7/1944 | Whitney | 85/45 |
| 2,397,216 | 3/1946 | Stellin | 85/45 |
| 2,556,155 | 6/1951 | Stellin | 85/45 |
| 2,897,867 | 8/1959 | La Torre | 85/9 R X |
| 3,575,080 | 4/1971 | Hannay | 85/45 |

FOREIGN PATENT DOCUMENTS

| | | | |
|---|---|---|---|
| 449912 | 7/1948 | Canada | 85/9 R |
| 2311935 | 9/1973 | Fed. Rep. of Germany | 85/9 R |
| 1558026 | 1/1969 | France | 85/45 |
| 48-5425 | 2/1973 | Japan | 85/9 R |
| 48-5427 | 2/1973 | Japan | 85/9 R |
| 48-21055 | 3/1973 | Japan | 85/9 R |
| 48-87452 | 10/1973 | Japan | 85/9 R |
| 50-141060 | 11/1975 | Japan | 85/9 R |
| 51-21763 | 2/1976 | Japan | 85/9 R |
| 51-59758 | 5/1976 | Japan | 85/9 R |
| 357468 | 9/1931 | United Kingdom | 85/45 |

*Primary Examiner*—Thomas J. Holko
*Attorney, Agent, or Firm*—Fleit & Jacobson

[57] ABSTRACT

An upset bolt provided with a pressure formed recess on the bolt head. The recess is formed by the combination of three separate surfaces, that is, concave, convex and flat standing surfaces which respectively form lower, middle and upper portions of the recess. By virtue of provision of the concave and convex surfaces respectively in lower and middle portions of the recess, stress concentration occurs in the region along the concave and concave surfaces when the recess is pressure formed. Since the region of stress concentration is positioned away from the neck portion of the bolt body, the breaking strength is remarkably increased as compared with conventional upset bolt in which the stress concentration occurs in a region near the neck portion of the bolt body. Provision of the six flat standing surfaces along the periphery of the hexagonal bolt head makes it possible to sharply form the apexes of the bolt head without application of such an extremely great pressure force as to shorten the life of the dies used in deformation of the bolt head.

1 Claim, 4 Drawing Figures

UPSET BOLT

This invention relates to improvement in an upset bolt.

Heretofore, many kinds of upset bolts have been developed by those skilled in the art in order to reduce the amount of material and weight of the bolt itself by pressure forming a recess on the bolt head.

However, in the conventional upset bolt, it is usual either to form a recess having a flat bottom surface or to form a spherical recess which does not conform to the hexagonal outline of the bolt head.

The essential fault in the former case is that a region of no material flow called a "dead metal region" occurs just beneath the flat bottom surface of the recess so that the region of stress concentration which occurs in the region of maximum deformation is lowered to a level just above the neck portion, that is, the connecting portion between the bolt head and the bolt shank. As a result, the bolt head tends to be easily broken from the neck portion when tightening torque is applied thereto.

The essential fault in the latter case is that the apexes of the hexagonal head cannot be sharply formed, since the material thickness in upper portion of the bolt head between the spherical surface and the hexagonal outer surface is not uniform throughout. In this case, it is necessary to apply extremely great pressure force to sharply form the hexagonal apexes. However, the extremely great pressure force shortens the life of dies and therefore lowers the productivity of the upset bolt.

The object of the present invention is to provide an upset bolt which is free of the aforementioned faults.

Other objects, advantages and features of the present invention will become apparent from the following description taken in connection with the accompanying drawings in which:

FIGS. 1 and 2 respectively show two embodiments of the upset bolts in accordance with prior art.

Figure 1:
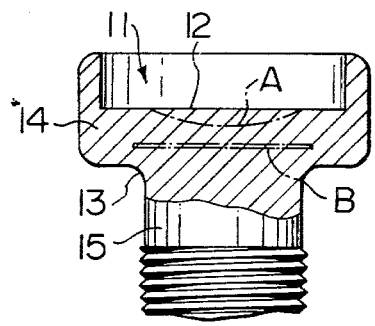

FIG. 1 illustrates one type of the conventional recess 11 which has a flat bottom surface 12. When the recess 11 is pressure formed, a region of no material flow called a "dead metal region" occurs just beneath the flat bottom surface 12. Therefore, the region of stress concentration B which occurs in the region of maximum deformation is lowered to a level just above the neck portion 13 connecting the bolt head 14 and the bolt shank 15. The occurence of the region of stress concentration B just above the neck portion 13 tends to cause easy breakage of the bolt at the neck portion when tightening torque is applied thereto by a wrench.

Figure 2:
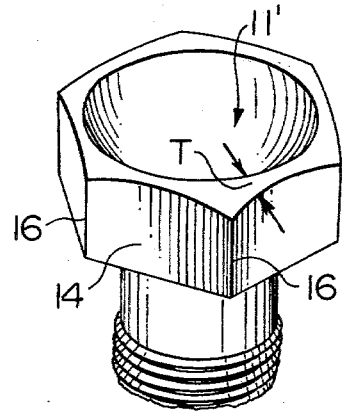

FIG. 2 illustrates another type of a conventional recess 11' which has a spherical configuration. In this type of recess, it is impossible to sharply form the apexes 16 of the hexagonal bolt head 14, since the material thickness T between the spherical surface and the hexagonal outer surface is not uniform.

Figure 3:
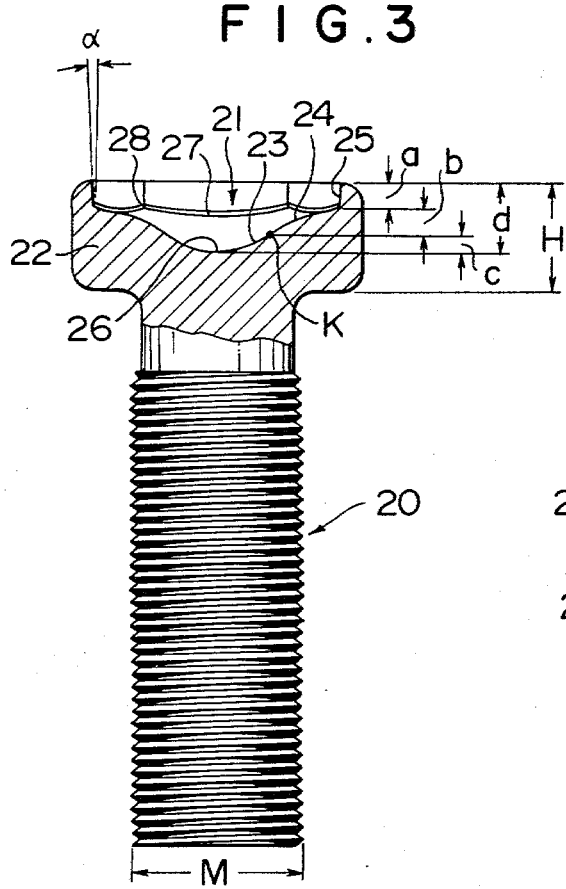
FIG. 3 is an elevational view, partially in section, of an upset bolt embodying the present invention.
Figure 4:
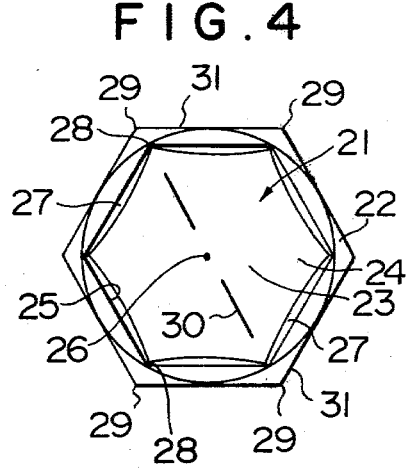
FIG. 4 is a plan view of the upset bolt shown in FIG. 3.

FIGS. 3 and 4 illustrate an embodiment of the upset bolt according to the present invention. A recess 21 is pressure formed on a bolt head 22 of a bolt body 20 by the upset method. As shown in the sectional view of the bolt head 22 of FIG. 3, the recess is formed by the combination of three separate configurations, namely an upper portion "a", a middle portion "b" and a lower portion "c". The whole depth "d" of the recess 21 is about $\frac{2}{3}$ H, wherein "H" is the height of the bolt head 22.

The lower portion c of the recess 21 is formed by a concave surface 23, the bottom 26 of which is positioned at about $\frac{2}{3}$ H from the top of the bolt head 22. The concave surface 23 extends about 1/6 H upwardly from the bottom 26 thereof. The radius of curvature of the concave surface 23 is about $\frac{1}{2}$ M, wherein "M" is the nominal diameter of the threaded body of the bolt.

The middle portion b of the recess 21 is formed by a convex surface 24 which is curved in the opposite direction to that of the concave surface 23. The lower end of the convex surface 24 is smoothly conjugated with the upper end of the concave surface 23 of the lower portion c, therefore a point "K" corresponds to the point of inflection. The convex surface 24 extends about $\frac{1}{4}$ H upwardly from the point K. The radius of curvature of the convex surface 24 is about 1.7–2.0 times of the nominal diameter M of the threaded body of the bolt.

The upper portion a of the recess 21 is formed by six standing surfaces 25. Each of the standing surfaces 25 is flat and is so arranged that it lies along one of the hexagonal outer surfaces 31 (FIG. 4) of the bolt head 22. The height of the standing surfaces 25 is about $\frac{1}{4}$ H. The lower end of each standing surface 25 is conjugated with the upper end of the convex surface 24. It is preferable to provide chamfered edges 27 of 1–2$^c$ at every conjugating portion between the standing surfaces 25 and the convex surface 24 and also to provide chamfered corners 28 of 0.5–1$^c$ at every hexagonal apex portion defined by the lower ends of every standing surfaces 25 and the upper end of the convex surface 24, in order to sharply form every apex 29 defined by the hexagonal outer surfaces 31 of the bolt head. It is also preferable to outwardly incline the standing surfaces 25 from the vertical line with an angle $\alpha$ of 1°–2°. Further, it is preferable to provide stamped marks 30 radially arranged from the center of the bottom 26 to indicate the tightening strength rating of the upset bolt.

As described in connection with the above embodiment, the recess 21 is formed of a plurality of surfaces comprising the upper standing surfaces 25, the middle convex surface 24 and the lower concave surface 23 and therefore the stress concentration in the region of maximum deformation occurs along the curved surfaces 23 and 24 at a position away from the neck portion of the bolt head. As a result, the upset bolt of the present invention has substantially the same tension strength and yield strength as a normal bolt in which no recess is provided. The provision of the standing surfaces 25 having $\frac{1}{4}$ height of the bolt head 22 and arranged along the hexagonal outer surfaces 31 has the effect of increasing the bolt strength as well as equalizing the material thickness along the periphery of the bolt head. The equalization of the material thickness between the standing surfaces 25 and the hexagonal outer surfaces 31 makes it possible to sharply form the apexes 29 of the hexagonal bolt head 22 without application of such an extremely great pressure force as to shorten the life of the dies used in deformation of the bolt head.

The upset bolt of the present invention can reduce the amount of material used therein and therefore the weight of the bolt, and further eliminates the faults peculiar to conventional upset bolts.

What we claimed is:

1. A hexagonal bolt having a threaded body and a bolt head provided with a pressure formed recess, the recess being formed by a combined surface comprising:
- a lower concave surface, the radius of curvature of the concave surface being about ½ the nominal diameter M of the threaded body of the bolt,
- a middle convex surface oppositely curved to said concave surface, a lower end of the convex surface being smoothly conjugated with a top end of said concave surface and the radius of curvature of the convex surface being about 1.7 to 2 times the nominal diameter M of the threaded body of the bolt, and
- a plurality of upper flat standing hexagonal surfaces spaced from the outer periphery of the hexagonal bolt head, each of the flat standing surfaces having a height of approximately ¼ the height of the bolt head.